(12) United States Patent
Suciu

(10) Patent No.: US 8,770,359 B2
(45) Date of Patent: Jul. 8, 2014

(54) COLLOIDAL DAMPER

(75) Inventor: Claudiu Valentin Suciu, Fukuoka (JP)

(73) Assignee: School Juridical Person of Fukuoka Kogyo Daigaku, Fukuoka (JP)

(*) Notice: Subject to any disclaimer, the term of this patent is extended or adjusted under 35 U.S.C. 154(b) by 82 days.

(21) Appl. No.: 13/396,008

(22) Filed: Feb. 14, 2012

(65) Prior Publication Data

US 2012/0145495 A1 Jun. 14, 2012

Related U.S. Application Data

(63) Continuation-in-part of application No. 12/310,656, filed as application No. PCT/JP2007/000903 on Aug. 24, 2007, now abandoned.

(30) Foreign Application Priority Data

Sep. 6, 2006 (JP) .................................. 2006-242056

(51) Int. Cl.
*F16F 9/30* (2006.01)
(52) U.S. Cl.
CPC ........................................ *F16F 9/30* (2013.01)
USPC ........................ 188/268; 188/322.19; 188/314
(58) Field of Classification Search
USPC ................. 188/268, 317, 322.5, 322.19, 314; 267/116, 64.23
IPC .......................................................... F16F 9/30
See application file for complete search history.

(56) References Cited

U.S. PATENT DOCUMENTS

| 2,701,714 | A | | 2/1955 | Harwood | |
|---|---|---|---|---|---|
| 3,331,398 | A | * | 7/1967 | Goss | ................................ 138/26 |
| 3,424,448 | A | | 1/1969 | Ma | |

(Continued)

FOREIGN PATENT DOCUMENTS

| DE | 10132606 A1 | * | 1/2003 | ................ E05F 1/10 |
|---|---|---|---|---|
| JP | 61167730 A | * | 7/1986 | ................ F16F 9/30 |

(Continued)

OTHER PUBLICATIONS

International Search Report issued Dec. 4, 2007 in the International (PCT) Application of which the present application is the U.S. National Stage.

(Continued)

*Primary Examiner* — Bradley King
*Assistant Examiner* — Stephen Bowes
(74) *Attorney, Agent, or Firm* — Wenderoth, Lind & Ponack, L.L.P.

(57) ABSTRACT

A colloidal damper includes: a cylinder; a piston guided and supported by the cylinder and defining a closed space in association with the cylinder; a porous body having a multiplicity of first pores and being housed in the closed space; a liquid contained in the closed space together with the porous body, the liquid flowing into the first pores of the porous body when pressurized, and flowing out from the first pores of the porous body when the pressure is relieved. The damper may include a partition wall which has a multiplicity of second pores and which isolates the porous body from a frictional area, each of the second pores having a diameter smaller than the outer diameter of the porous body. The porous body may have an outer diameter larger than the size of the gap formed between the cylinder and the piston.

14 Claims, 15 Drawing Sheets

(56) References Cited

U.S. PATENT DOCUMENTS

| | | | |
|---|---|---|---|
| 4,386,686 A * | 6/1983 | Miura | 188/322.17 |
| 5,163,706 A * | 11/1992 | Maguran et al. | 188/283 |
| 5,238,252 A | 8/1993 | Stewen et al. | |
| 6,052,992 A | 4/2000 | Eroshenko | |
| 6,315,093 B1 * | 11/2001 | Miura et al. | 188/282.1 |
| 6,615,959 B2 * | 9/2003 | Eroshenko | 188/268 |

FOREIGN PATENT DOCUMENTS

| | | | | |
|---|---|---|---|---|
| JP | 03265729 A | * | 11/1991 | F16F 9/08 |
| JP | 04370427 A | * | 12/1992 | F16F 9/30 |
| JP | 2004-044732 | | 2/2004 | |
| JP | 2005-121092 | | 5/2005 | |
| JP | 2006-118571 | | 5/2006 | |
| WO | 96/18040 | | 6/1996 | |
| WO | 01/55616 | | 8/2001 | |

OTHER PUBLICATIONS

C.V. Suciu, K. Yaguchi, "Endurance Tests on a Colloidal Damper Destined to Vehicle Suspension", Experimental Mechanics, Aug. 22, 2007.

Claudiu Valentin Suciu, Shingo Tani, Kazuhiko Yaguchi, "On the fatigue fracture at adsorption/desorption of water in/from liquid-repellent nanoporous silica", Acta Mechanica, vol. 214, pp. 195-203, Aug. 16, 2009.

* cited by examiner

COLLOIDAL DAMPER

This application is a Continuation In Part of U.S. application Ser. No. 12/310,656, filed Mar. 3, 2009 now abandoned, which is a national stage application of International Application No. PCT/JP2007/000903, filed Aug. 24, 2007.

FIELD OF THE INVENTION

This invention relates to a colloidal damper which accommodates in a closed space a mixture of a liquid and a porous body such as silica gel, and allows the liquid to flow-into the pores and to flow-out from the pores of the porous body in order to dissipate the externally exerted mechanical energy.

BACKGROUND ART

A colloidal damper is a device which accommodates in a closed space a mixture of a liquid and a porous body such as silica gel, and allows the liquid to flow-into the pores and to flow-out from the pores of the porous body in order to dissipate the externally exerted mechanical energy (see for instance, the Patent References 1 and 2).

In order to use such a colloidal damper in practical applications, it is necessary to achieve a colloidal damper able to continuously and repeatedly perform under a sufficient number of cycles, according to a specific application. Ways to achieve the enhancement of the performances of such a colloidal damper are suggested for instance in the Patent References 3 to 5.

Patent Reference 1: International Publication 96/18040 pamphlet
Patent Reference 2: International Publication 01/55616 pamphlet
Patent Reference 3: Japanese Patent Application Publication No. 2004-44732
Patent Reference 4: Japanese Patent Application Publication No. 2005-121092
Patent Reference 5: Japanese Patent Application Publication No. 2006-118571

DISCLOSURE OF THE INVENTION

Problem to be Solved by the Invention

The colloidal damper is presently in the development stage, but it is expected to further improve its durability. As a result of the research performed, the inventor has found that, during the durability tests up to about 100,000 working cycles, in the case of a conventional colloidal damper occurs the problem of severe leakage from the closed space of the liquid and even of the porous body.

In view of the above-mentioned problem, the objective of the present invention is to further enhance the durability of the colloidal damper.

Solution to the Problem

The colloidal damper in accordance with the present invention includes a cylinder, a piston guided and supported by the cylinder during its reciprocating movement, and defining a closed space in association with the cylinder, a porous body having a multiplicity of pores and being housed in the closed space, and a liquid contained in the closed space together with the porous body, the liquid flowing into the pores of the porous body when pressurized, and flowing out from the pores of the porous body when the pressure is relieved, the colloidal damper further including a partition wall which has a multiplicity of pores and each pore has a diameter smaller than the outer diameter of the porous body, and isolates the porous body from a frictional area that occurs at the relative movement between the piston and the cylinder.

In the case of a colloidal damper in accordance with the present invention, since the porous body cannot pass through the pores of the partition wall, and only the liquid can pass through the pores of the partition wall, it is possible to prevent the porous body from entering a gap formed between the cylinder and the piston. Since the liquid can pass through the pores of the partition wall, the liquid flows into the pores of the porous body when pressurized, and flows out from the pores of the porous body when the pressure is relieved, ensuring improved performances of the colloidal damper.

The colloidal damper in accordance with the present invention may be designed to further include an additional tank allowing an extension of the closed space already defined in association with the cylinder, wherein the partition wall is disposed between the cylinder and the additional tank. In this embodiment it becomes possible to contain the porous body inside the additional tank, and to allow only the liquid to flow between the cylinder and the additional tank through the pores of the partition wall, ensuring improved performances of the colloidal damper.

The partition wall may be designed to divide an inner space of the cylinder into two zones. In this embodiment it becomes possible to isolate the porous body inside of a specific zone of the cylinder without using an additional tank, and preventing the porous body to enter a gap formed between the cylinder and the piston.

As an alternative, the partition wall may be designed to surround and isolate the porous body therein the closed space. In this embodiment it becomes possible to contain the porous body inside of the space surrounded by the partition wall, and to allow only the liquid to flow-into the space surrounded by the partition wall at pressurization and to flow-out from the space surrounded by the partition wall when the pressure is relieved, by passing through the pores of the partition wall, ensuring improved performances of the colloidal damper.

It is preferable that the colloidal damper in accordance with the present invention further includes a packing used for reciprocal movement which allows the sealing of the closed space on the frictional area that occurs at the relative movement between the piston and the cylinder, a fixing element to support the packing, an O-ring for sealing the gap between the fixing element and the outer surface of the cylinder, and a metal ring disposed on the external circumference of the O-ring. In this embodiment, the metal ring disposed on the external circumference of the O-ring makes contact with the O-ring placed between the fixing element and the outer surface of the cylinder, preventing the excessive deformation of the O-ring and maintaining good sealing conditions at the interstice between the fixing element and the cylinder. Thus, even if the porous body and the liquid are still able to leak out internally at the packing used for reciprocal movement on the frictional area that occurs at the relative movement between the piston and the cylinder, it would be possible to prevent the external leakage of the porous body and the liquid at the interstice between the fixing element and the cylinder.

It is preferable that the porous body has an outer diameter larger than the size of the gap formed between the cylinder and the piston. In this embodiment it becomes possible to prevent the porous body from entering inside of the gap formed between the cylinder and the piston.

The colloidal damper in accordance with the present invention includes a cylinder, a piston guided and supported by the cylinder during its reciprocating movement, and defining a closed space in association with the cylinder, a porous body having a multiplicity of pores and being housed in the closed space, and a liquid contained in the closed space together with the porous body, the liquid flowing into the pores of the porous body when pressurized, and flowing out from the pores of the porous body when the pressure is relieved, the porous body having an outer diameter larger than the size of the gap formed between the cylinder and the piston. The present invention provides a colloidal damper capable of preventing the porous body from entering inside of the gap formed between the cylinder and the piston.

Advantages Provided by the Invention (1) Since the colloidal damper is designed to include a partition wall which has a multiplicity of pores and each pore has a diameter smaller than the outer diameter of the porous body, it is possible to achieve the isolation of the porous body from a frictional area that occurs at the relative movement between the piston and the cylinder, and thus it becomes possible to prevent the porous body from entering a frictional area that occurs at the relative movement between the piston and the cylinder, ensuring enhancement in durability of the colloidal damper.

(2) Since the colloidal damper may be designed to include an additional tank allowing an extension of the closed space already defined in association with the cylinder, in which case, the partition wall is disposed between the cylinder and the additional tank, it is possible to contain the porous body inside of the additional tank, and to allow only the liquid to flow between the cylinder and the additional tank through the pores of the partition wall, ensuring improved performances of the colloidal damper. Furthermore, it is also possible to prevent the porous body from entering a frictional area that occurs at the relative movement between the piston and the cylinder, ensuring enhancement in durability of the colloidal damper.

(3) The partition wall may be designed to divide an inner space of the cylinder into two zones. In this way it becomes possible to isolate the porous body inside of a specific zone of the cylinder without using an additional tank, and to prevent the porous body from entering a gap formed between the cylinder and the piston. Thus, it is provided a small-sized and low-cost colloidal damper with improved durability without using an additional tank.

(4) The partition wall may be designed to surround and isolate the porous body therein the closed space. In this embodiment it becomes possible to contain the porous body inside of the space surrounded by the partition wall, and to allow only the liquid to flow-into the space surrounded by the partition wall at pressurization and to flow-out from the space surrounded by the partition wall when the pressure is relieved, by passing through the pores of the partition wall, and thus ensuring improved performances of the colloidal damper. As a result, it is also possible to prevent the porous body from entering a frictional area that occurs at the relative movement between the piston and the cylinder, ensuring enhancement in durability of the colloidal damper.

(5) The colloidal damper may be designed to further include a packing used for reciprocal movement which allows the sealing of the closed space on the frictional area that occurs at the relative movement between the piston and the cylinder, a fixing element to support the packing, an O-ring for sealing the gap between the fixing element and the outer surface of the cylinder, and a metal ring disposed on the external circumference of the O-ring. In this embodiment, the metal ring disposed on the external circumference of the O-ring makes contact with the O-ring placed between the fixing element and the outer surface of the cylinder, preventing the excessive deformation of the O-ring and maintaining good sealing conditions at the interstice between the fixing element and the cylinder. Thus, even if the porous body and the liquid are still able to leak out internally at the packing used for reciprocal movement on the frictional area that occurs at the relative movement between the piston and the cylinder, it would be possible to prevent the external leakage of the porous body and the liquid at the interstice between the fixing element and the cylinder, ensuring further enhancement in durability of the colloidal damper.

(6) The porous body may be designed to have an outer diameter larger than the size of the gap formed between the cylinder and the piston, in which case, it is possible to prevent the porous body from entering inside of the gap formed between the cylinder and the piston, ensuring enhancement in durability of the colloidal damper.

INDICATION BY REFERENCE NUMERALS

| | |
|---|---|
| 1, 20, 30 | Colloidal damper |
| 2, 21 | Cylinder |
| 3, 22, 35 | Closed space |
| 4 | Piston |
| 5 | Additional tank |
| 6, 23 | Filter |
| 6a | Copper gasket |
| 7 | Liquid |
| 8 | Porous body |
| 8a | Pores |
| 8b | Cavity |
| 8c | Outer surface of the porous body |
| 8d | Inner surface of the pores of the porous body |
| 8e | Inner surface of the cavity of the porous body |
| 9 | Frictional area that occurs at the relative movement between the piston and the cylinder |
| 10 | Packing used for reciprocal movement |
| 11 | Back-up ring |
| 12 | Fixing element |
| 13 | O-ring |
| 14 | Metal ring |
| 15 | Dust seal |
| 16 | High-pressure gauge |
| 17 | Thermocouple |
| 18 | Low-pressure cylinder |
| 19a | Upper socket used to connect the pump |
| 19b | Lower socket used to connect the pump |
| 19c | Manual pump |
| 19d | Electrical pump |
| 31 | Porous body unit |
| 32 | Tube |
| 33 | Cover |
| 34 | Pores |
| 40 | Controller |
| 41 | Digital thermometer |
| 42 | Displacement sensor |
| 43 | Amplifier |
| 44 | Display unit |
| A | Leakage |
| d1 | Average inner diameter of the pores |
| d2 | Average outer diameter of the porous bodies |
| p | Pressure |
| S | Stroke |

BEST EMBODIMENT FOR REDUCING THE INVENTION TO PRACTICE

First Exemplary Embodiment

Figure 1:
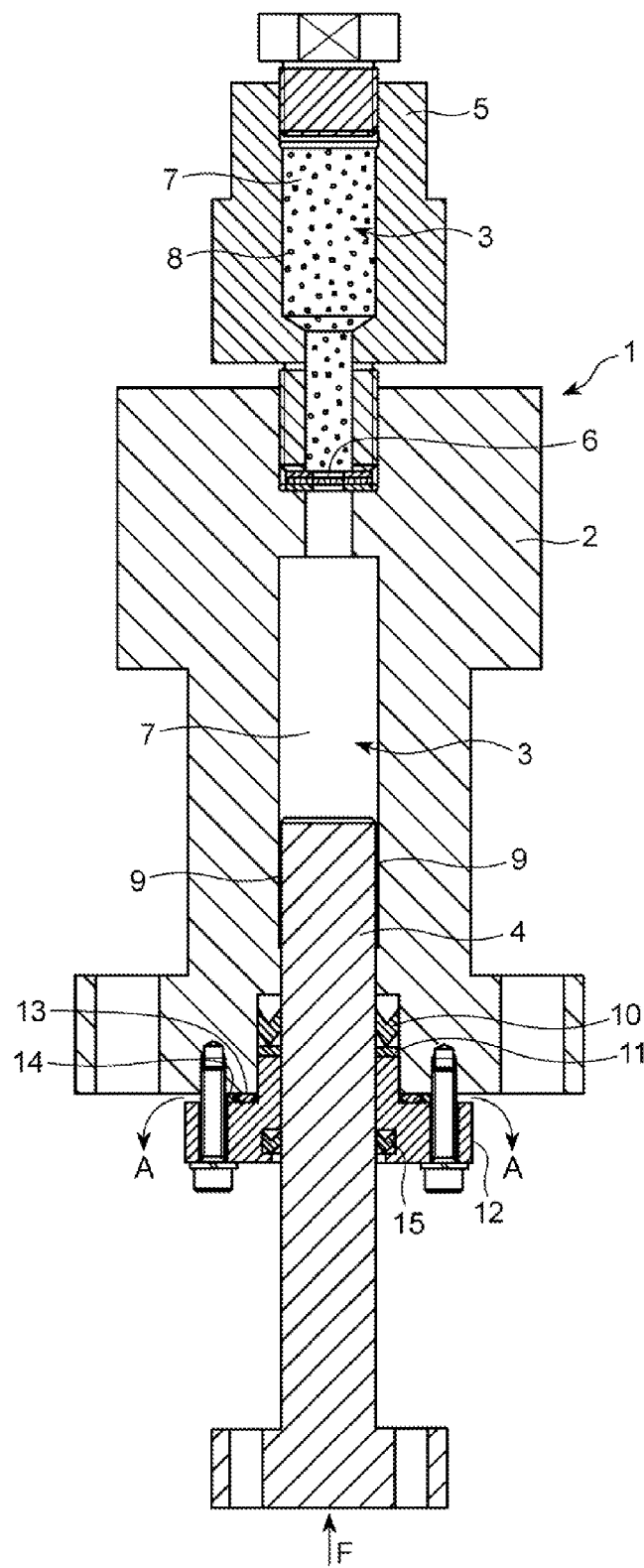
FIG. 1 is a cross-sectional view of the colloidal damper in accordance with the first exemplary embodiment of the present invention.

FIG. 1 is a cross-sectional view of the colloidal damper in accordance with the first exemplary embodiment of the present invention.

In FIG. 1, the colloidal damper 1 in accordance with the first exemplary embodiment of the present invention includes a cylinder 2, a piston 4 guided and supported by the cylinder 2 during its reciprocating movement, and defining a closed space 3 in association with the cylinder 2, an additional tank 5 allowing an extension of the closed space 3 already defined in association with the cylinder 2, and a filter 6 as a partition wall dividing the closed space 3 into two zones, one inside the cylinder 2 and the other inside of the additional tank 5.

Figure 2:
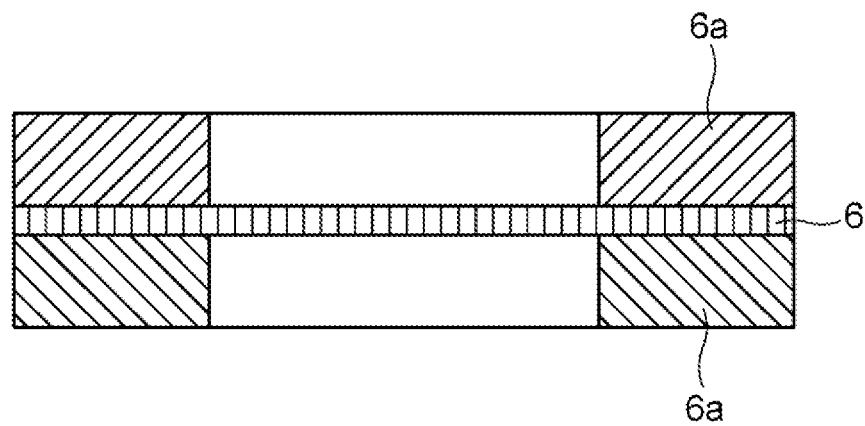
FIG. 2 is a cross-sectional view of the filter.

FIG. 2 is a cross-sectional view of the filter 6. The filter 6 is adhered between two copper gaskets 6a by using of an adhesive. These two copper gaskets 6a act as a frame supporting the filter 6 in between. The filter 6 is fixedly sandwiched between the cylinder 2 and the additional tank 5, and as a result, the copper gaskets 6a are sufficiently deformed to make close contact with both the cylinder 2 and the additional tank 5, thereby sealing the closed space 3 formed in the cylinder 2 and the closed space 3 formed in the additional tank 5 from each other.

Figure 3:
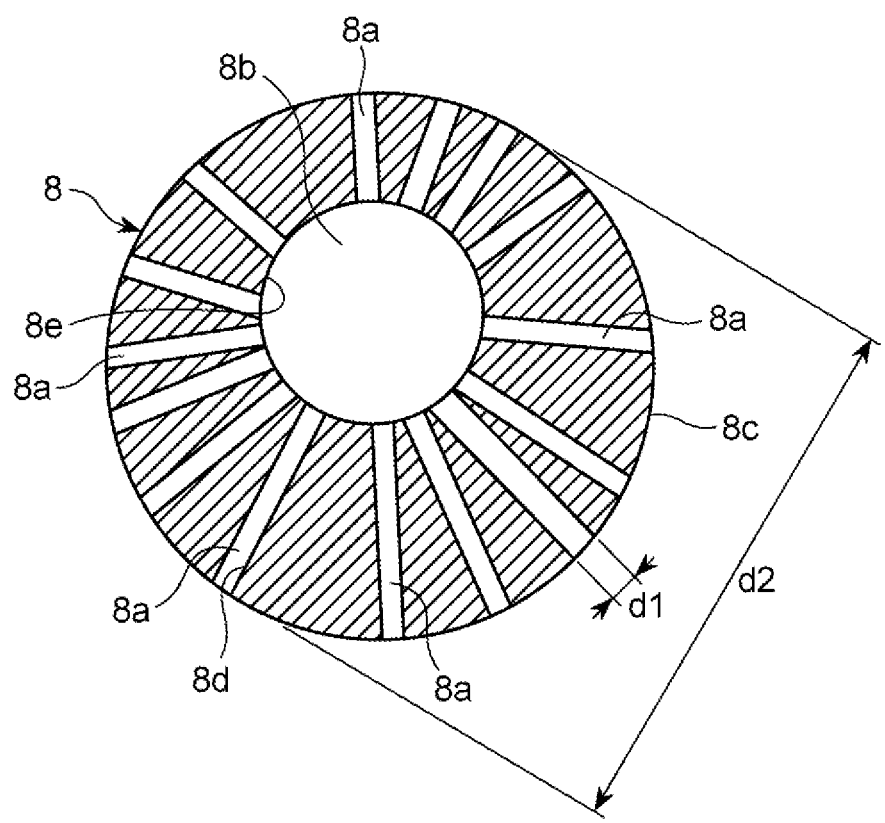
FIG. 3 is a cross-sectional view of the porous body.

In the closed space 3 are housed a liquid 7 and porous bodies 8 each porous body having a multiplicity of pores 8a. FIG. 3 is a cross-sectional view of the porous body 8. The porous body 8 is comprised of a substantially quasi-spherical grain composed, for instance, from silica gel, aero gel, ceramics, porous glass, zeolite, porous PTFE, porous wax, porous polystyrene, alumina or carbon (including graphite, charcoal, fullerene and carbon nano-tube). The porous body 8 includes a plurality of pores 8a, and an almost centrally disposed cavity 8b. The pores 8a extend almost radially from the cavity 8b, and are open at one end at the surface of the cavity 8b and at the other end at the outer surface of the porous body 8.

The porous body 8 is covered at the outer surface 8c, inner surfaces 8d of the pores 8a and the inner surface 8e of the cavity 8b with a material which is lyophobic relative to the liquid 7, and the lyophobic material consists of linear molecular chains, for instance organic chains such as —Si-(BASE)$_2$-(BODY)$_m$-(HEAD) wherein "m" is in the range of 0 to 23, where possible combinations of "BODY" and "HEAD" [(BODY), (HEAD)] includes [$CH_2$, $CH_3$], [$CF_2$, $CF_3$], [OSi$(CH_3)_2$, OSi$(CH_3)_3$] and [OSi$(CF_3)_2$, OSi$(CF_3)_3$]. A base (BASE) has a molecular chain with a length shorter than that corresponding to the chain-(BODY)$_m$-(HEAD), and it is comprised of either an alkyl group, having a number of carbon atoms in the range of 1 to 3, or a phenyl group.

The liquid 7 is required to have high surface tension, and accordingly, water is a typical example. Apart from water, solutions of water may be used as the working liquid 7. For instance, water may be mixed with at least one or more antifreeze agents such as ethanol, ethylene glycol, propylene glycol and glycerin, reaching a concentration up to 67 volume %, in which case, it would be possible to use the colloidal damper even at 0 degree centigrade or lower temperatures. As an alternative, water may be mixed with a liquid which has a higher vaporization point than water, such as dimethyl-formamide and formamide, in which case, it would be possible to use the colloidal damper even at 100 degree centigrade or higher temperatures. As another alternative, a mixture of water and antifoaming agent may be used. For instance, water may be mixed with at least one or more antifoaming agents such as silicon-based antifoaming agents, non-silicon antifoaming agents and oily antifoaming agents, reaching a concentration up to 50 ppm, in which case, it would be possible to use the colloidal damper even if air flows into the closed space 3 through the seal. The average inner diameter "d1" of the pores 8a is selected to satisfy the condition that the Knudsen number Kn, defined as Lp/(d1×½), is larger or equal to 0.034, but smaller or equal to 0.119 (preferably 0.097), wherein Lp indicates the mean free path of the liquid molecules. An average outer diameter "d2" of the porous body 8 is selected to satisfy the condition that "d2" is in the range of 10×"d1" to 10,000×"d1", including both the lower and upper limits.

The porous body 8 is contained only in the zone of the closed space 3 located in the upper side of the filter 6 in FIG. 1, namely, in the zone of the closed space 3 located inside the additional tank 5. The filter 6 has a multiplicity of pores, each pore having a diameter smaller than the average outer diameter "d2" of the porous body 8, and accordingly, it does not allow the porous body 8 to pass through, but it allows the liquid 7 to pass through. Thus, the pores of the filter 6 isolate the porous body 8 from a frictional area 9 that occurs at the relative movement between the piston 4 and the cylinder 2, and allows only the liquid 7 to move in the closed space 3 formed in the cylinder 2 and the additional tank 5.

Concerning the quantities of the porous body 8 and the liquid 7 which are contained in the closed space 3, it is necessary to make sure that the ratio $V_P/V_L$ is in the range of 0.2 to 2.5 both inclusive, wherein $V_P$ indicates the total volume of the pores 8a of the porous body 8, and $V_L$ indicates the total volume of the liquid 7. In the first exemplary embodiment, the rate $V_P/V_L$ is selected to a typical value, equal to one (1).

The colloidal damper 1 in the first exemplary embodiment is designed to further include a packing 10 used for reciprocal movement which allows the sealing of the closed space 3 on the frictional area that occurs at the relative movement between the piston 4 and the cylinder 2, a backup ring 11 to suppress the excessive deformation of the packing 10, a fixing element 12 to support the packing 10, an O-ring 13 for sealing the gap between the fixing element 12 and the outer surface of the cylinder 12, a metal ring 14 disposed on the external circumference of the O-ring 13, and a dust seal 15 to prevent dust from entering inside of the gap between the piston 4 and the fixing element 12.

In the case of a colloidal damper 1 that employs the above-mentioned structure, when a force F is applied to the piston 4, the force F is transferred to the liquid 7 through the action of the piston 4, and hence, the liquid 7 is pressurized. Thus, the pressurized liquid 7, from the closed space 3 within the additional tank 5, flows-into the pores 8a of the porous body 8, working against the surface tension, which tends to push-out the liquid 7 from the pores 8a of the porous body 8. As a result, the movement of the piston 4 produces a reduction of the volume of the closed space 3. In addition, since the energy of shock and vibration associated to the external force F is relieved by the liquid 7 flowing into the pores 8a, the force F acting on the piston 4 is attenuated.

If the force F applied on the piston 4 is relieved, the liquid 7, previously forced to flow into the pores 8a against the surface tension, flows out from the pores 8a of the porous body 8 due to the repelling action of the surface tension working on the lyophobic inner surfaces 8d of the pores 8a. As a result, the movement of the piston 4 produces an augmentation of the volume of the closed space 3 and, consequently, the piston 4 returns back to its initial position. While the piston 4 is moving, the porous body 8 does not pass through the pores of the filter 6, but is contained inside the closed space 3 from the additional tank 5. Thus, only the liquid 7 passes through the pores of the filter 6. Accordingly, since the porous body 8 does not escape into the closed space 3 from the cylinder 2 of the colloidal damper 1, it is possible to prevent the porous body 8 from entering into the frictional area 9 that occurs at the relative movement between the piston 4 and the cylinder 2.

Figure 15:
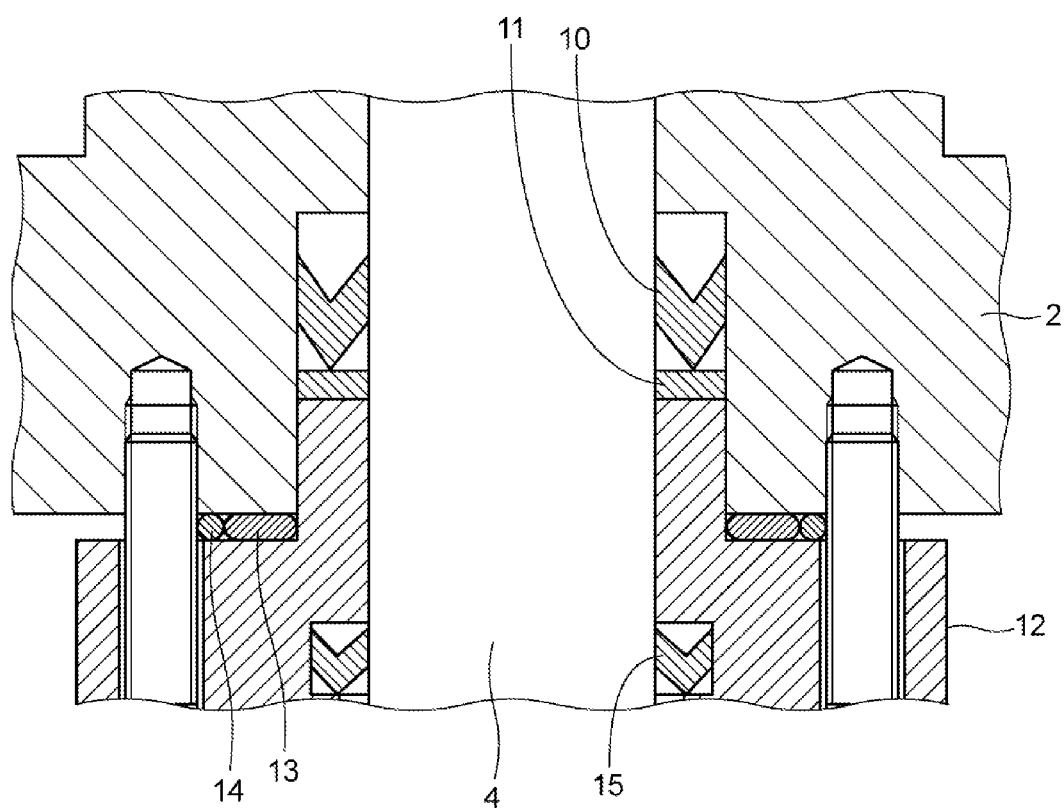
FIG. 15 is a partial cross-sectional view of the colloidal damper in accordance with the first exemplary embodiment of the present invention.

FIG. 15 is a partial cross-sectional view of the colloidal damper 1.

Furthermore, since the metal ring 14 disposed on the external circumference of the O-ring 13 makes contact with the O-ring 13 placed between the fixing element 12 and the outer surface of the cylinder 2, as illustrated in FIG. 15, preventing the excessive deformation of the O-ring 13 and maintaining good sealing conditions at the interstice between the fixing element 12 and the cylinder 2, it would be possible to prevent the external leakage "A" of both the porous body 8 and the liquid 7, even if they are still able to leak out internally through the packing 10 disposed around the frictional area 9 of the piston 4.

Second Exemplary Embodiment

Figure 4:
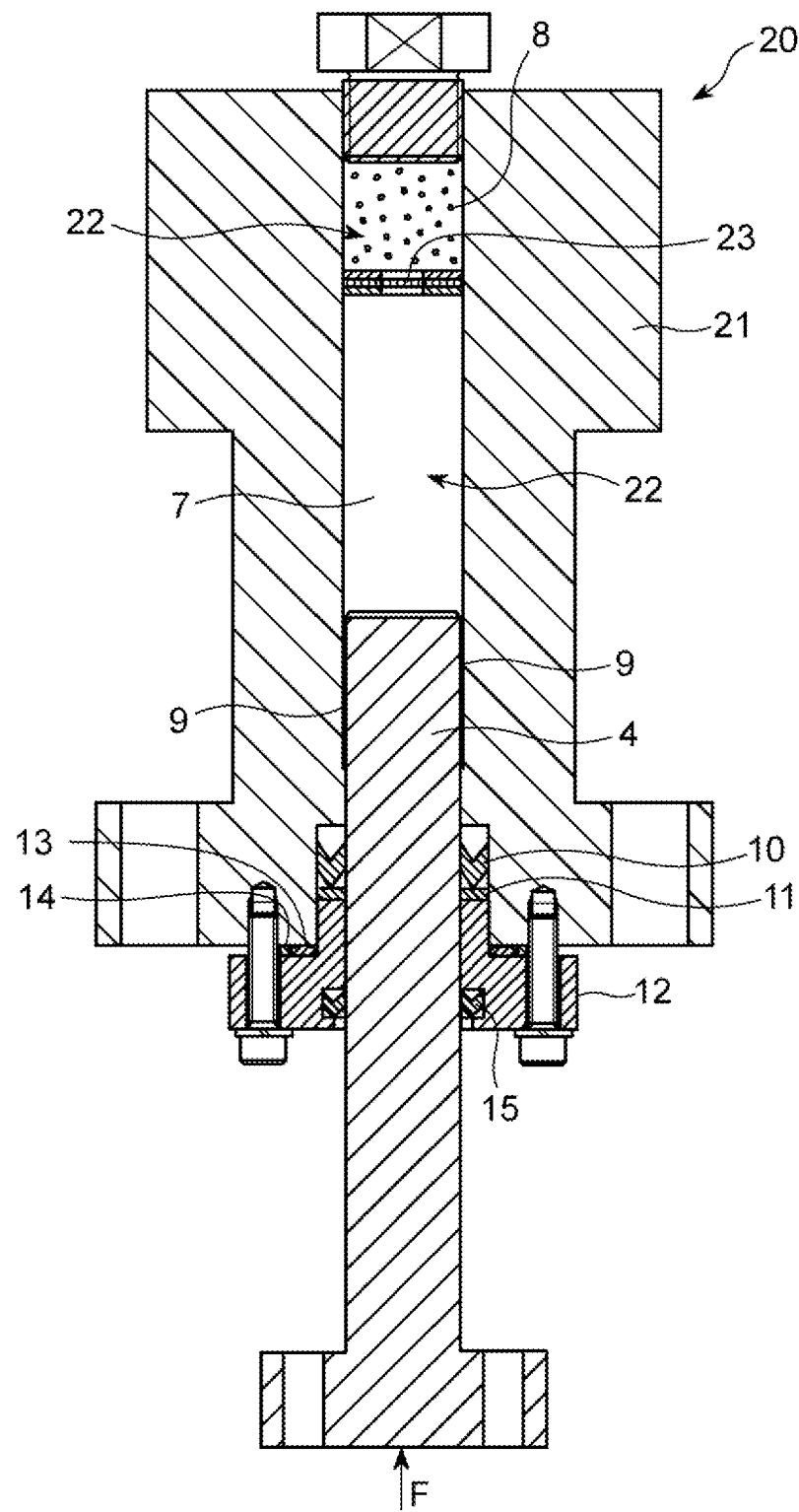
FIG. 4 is a cross-sectional view of the colloidal damper in accordance with the second exemplary embodiment of the present invention.

FIG. 4 is a cross-sectional view of the colloidal damper in accordance with the second exemplary embodiment of the present invention.

The colloidal damper 20 in accordance with the second exemplary embodiment of the present invention, illustrated in FIG. 4, is designed to include a filter 23 as a partition wall in order to divide the closed space 22 of the cylinder 21 into two zones. The colloidal damper 20 has the same structure as that of the colloidal damper 1 in accordance with the first exemplary embodiment except that the colloidal damper 20 does not include the additional tank 5.

The porous body 8 is contained only in the closed space 22 disposed in the upper side of the filter 23 in FIG. 4, namely, only in the closed space 22 disposed at the opposite side of the frictional area 9 that occurs at the relative movement between the piston 4 and the cylinder 21. The colloidal damper 20 employing the above-mentioned structure, without using the additional tank 5, can isolate the porous body 8 in the cylinder 21 from the frictional area 9 that occurs at the relative movement between the piston 4 and the cylinder 21, and accordingly, can prevent the porous body 8 from entering the frictional area 9.

Third Exemplary Embodiment

Figure 5:
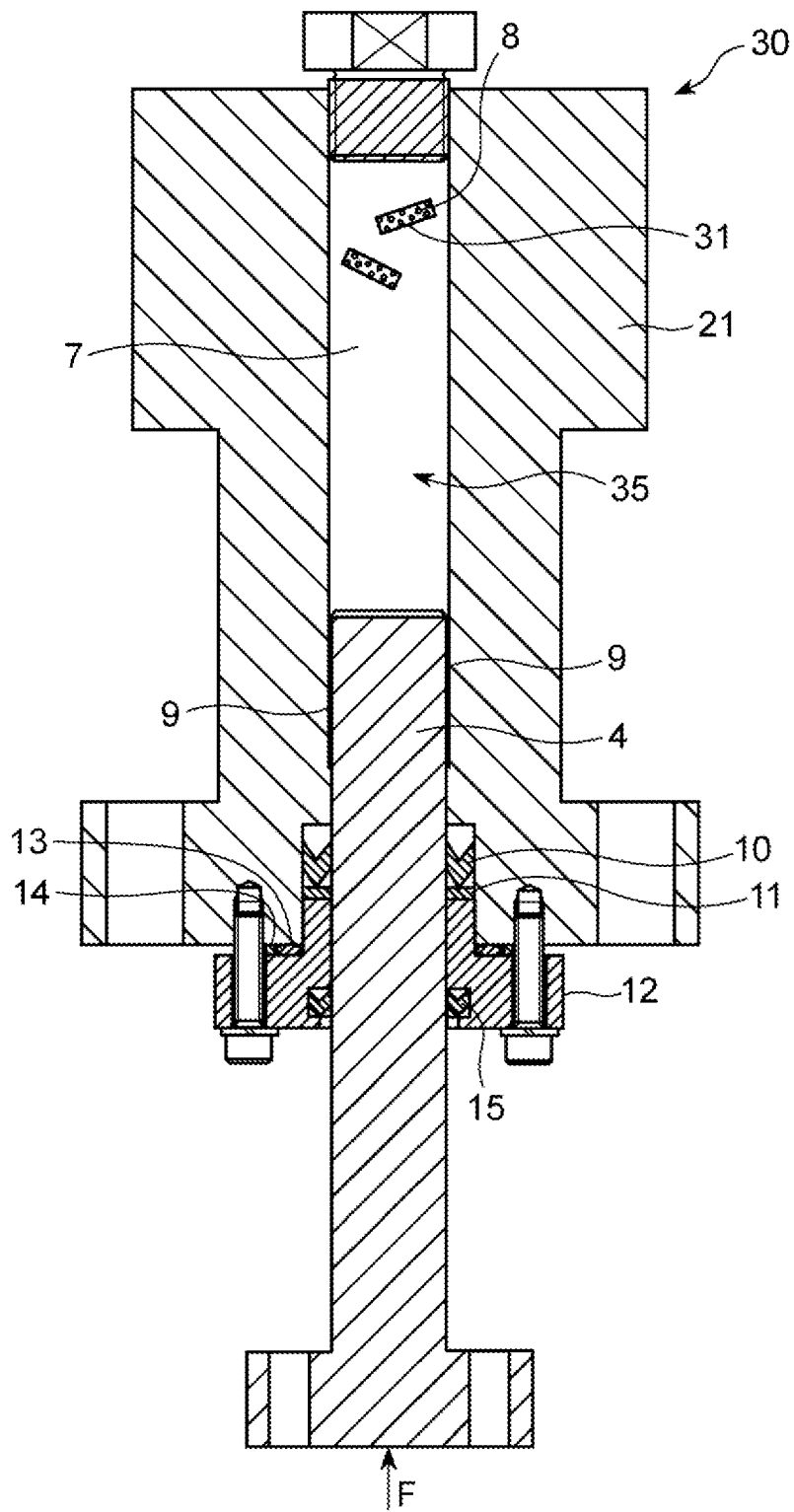
FIG. 5 is a cross-sectional view of the colloidal damper in accordance with the third exemplary embodiment of the present invention.
Figure 6:
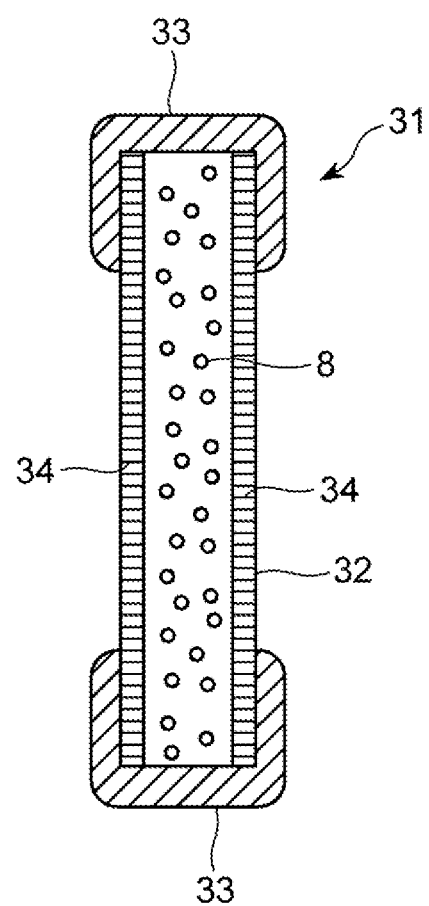
FIG. 6 is a cross-sectional view of the porous body unit shown in FIG. 5.

FIG. 5 is a cross-sectional view of the colloidal damper in accordance with the third exemplary embodiment of the present invention, and FIG. 6 is a cross-sectional view of the porous body unit shown in FIG. 5.

In FIG. 5, the colloidal damper 30 in accordance with the third exemplary embodiment of the present invention is designed to include a porous body unit 31 illustrated in FIG. 6 to replace the filter 23 used in the colloidal damper 20 in accordance with the second exemplary embodiment.

As illustrated in FIG. 6, the porous body unit 31 includes a tube 32 composed of porous glass inside of which the porous bodies 8 are contained. The tube 32 is closed at its opposite ends with covers 33. The tube 32 has the same function as that of the filter 23 used in the second exemplary embodiment, and is composed of porous glass having a multiplicity of pores 34, each pore having an outer diameter smaller than the average outer diameter of the porous bodies 8. The porous body unit 31 is housed in the closed space 35 defined in association with the cylinder 21 and the piston 4.

Since in the case of the colloidal damper 30, the tube 32 contains the porous bodies 8 therein, the tube 32 acts as a partition wall able to isolate the porous bodies 8 from the frictional area 9 that occurs at the relative movement between the piston 4 and the cylinder 21. Since the porous bodies 8 are contained inside of the tube 32, and only the liquid 7 is allowed to flow-into the tube 32 and flow-out from the tube 32 passing through the pores 34 of the tube 32 in the third exemplary embodiment, it is possible to prevent the porous bodies 8 from entering inside the frictional area 9.

The tube 32 may be composed of a material other than glass. Specifically, the tube 32 may be composed of a porous material having a multiplicity of pores 34, each pore having an outer diameter smaller than the average outer diameter of the porous bodies 8.

Fourth Exemplary Embodiment

The colloidal damper in accordance with the fourth exemplary embodiment employs porous bodies 8 having an outer diameter larger than the size of the gap at the frictional area 9 that occurs at the relative movement between the piston 4 and the cylinder 21, instead of using the porous body unit 31 defined in the third exemplary embodiment. Since the porous body 8 has an outer diameter larger than the gap between the cylinder 21 and the piston 4, the porous body 8 cannot enter inside the frictional area 9, ensuring enhancement in durability of the colloidal damper.

Fifth Exemplary Embodiment

Figure 16:
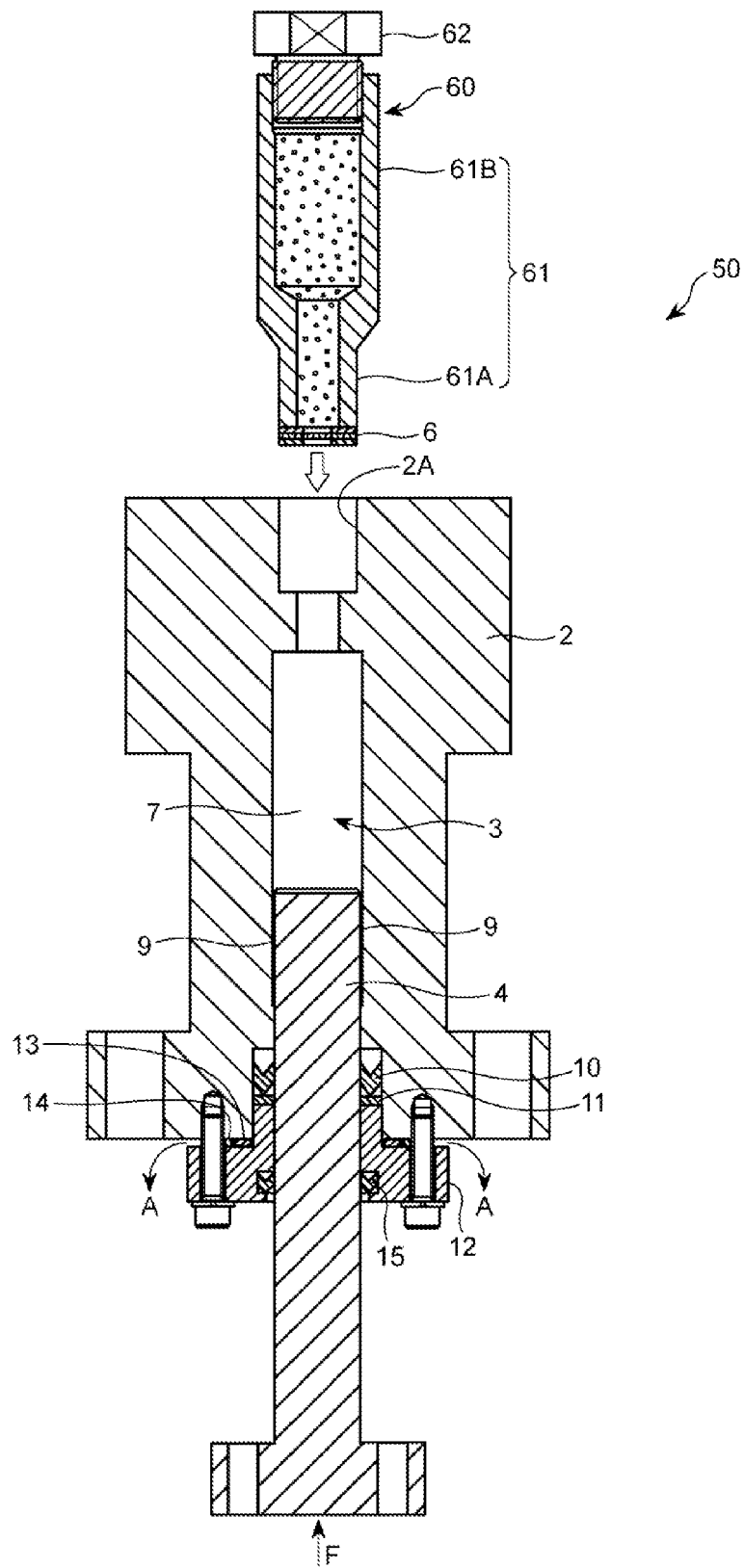
FIG. 16 is a cross-sectional view of the colloidal damper in accordance with the fifth exemplary embodiment of the present invention.

FIG. 16 is a cross-sectional view of the colloidal damper 50 in accordance with the fifth exemplary embodiment of the present invention.

Whereas the filter 6 is fixed to the cylinder 2 of the colloidal damper 1 in accordance with the first exemplary embodiment, illustrated in FIG. 1, the filter is detachably connected to the cylinder 2 of the colloidal damper 50 in accordance with the fifth exemplary embodiment.

As illustrated in FIG. 16, the colloidal damper 50 in accordance with the fifth exemplary embodiment is designed to include a cartridge 60. The cartridge 60 can be inserted into a through-hole 2A of the cylinder 2, and further, it can be detached from the cylinder 2. Accordingly, the used cartridge 60 can be exchanged to (replaced by) a new cartridge 60.

The cartridge 60 includes a case 61 which is hollowed in the length-wise or axial direction of the cartridge 60, a lid 62 detachably connected to one of the openings (upper opening in FIG. 16) of the case 61, and a filter 6 detachably connected to the other opening (lower opening in FIG. 16) of the case 61.

The case 61 includes a first cylindrical portion 61A that can be inserted into the through-hole 2A of the cylinder 2, and a second cylindrical portion 61B having an outer diameter larger than the outer diameter of the first cylindrical portion 61A.

For instance, the first cylindrical portion 61A of the case 61 can be provided at its outer lateral surface with an external (male) thread, and the through-hole 2A of the cylinder 2 can be provided at its inner lateral surface with an internal (female) thread, in which circumstances, the case 61 can be screwed into the through-hole 2A of the cylinder 2.

Similarly, the lid 62 can be provided at its outer lateral surface with an external (male) thread, and the second cylindrical portion 61B of the case 61 can be provided at its inner lateral surface with an internal (female) thread, in which circumstances, the lid 62 can screwed into the case 61.

As stated later, the inner hollowed space of the case 61 is filled with the liquid 7 and the porous bodies 8.

For instance, the cartridge 60 can be connected to the cylinder 2 as follows.

First, the lid 62 is demounted from the case 61, but the filter 6 is maintained as connected to the case 61. Then, the case 61 is inserted into the through-hole 2A of the cylinder 2.

Next, the liquid 7 is poured into the closed space 3 formed into the cylinder 2 and also into the hollowed space formed into the case 61 through the openings of the case 61.

Then, the porous bodies 8 are introduced into the liquid 7 through the opening (upper opening in FIG. 16) of the case 61.

Thereafter, the lid 62 is connected to the opening (upper opening in FIG. 16) of the case 61.

As an alternative, the cartridge 60 may be connected to the cylinder 2 as follows.

Before the cartridge 60 is inserted into the through-hole 2A of the cylinder 2, the liquid 7 is poured into the closed space 3 through the through-hole 2A of the cylinder 2.

Next, the lid 62 is demounted from the case 61, but the filter 6 is maintained as connected to the case 61. Then, the case 61 is inserted into the through-hole 2A of the cylinder 2.

Next, the porous bodies 8 are introduced into the hollowed space formed into the case 61, through the opening (upper opening in FIG. 16) of the case 61.

Then, the liquid 7 is poured into the hollowed space formed in the case 61, through the opening (upper opening in FIG. 16) of the case 61.

Note that in this case, it becomes possible to introduce only the porous bodies 8 into the hollowed space formed into the case 61, without pouring the liquid 7 into the hollowed space. In other words, when the cartridge 60 is connected to the cylinder 2, the case 61 does not contain the liquid 7 inside its hollowed space.

During operation of the colloidal damper 50, when the liquid 7 is pressurized by the piston 4, the liquid 7 flows from the closed space 3 of the cylinder 2 into the hollowed space of the case 61 by passing through the filter 6.

Since during pressurization the liquid 7 is absorbed inside the porous bodies 8, when the liquid 7 is depressurized by the piston 4, the liquid 7 flows out from the porous bodies 8 into the hollowed space of the case 61, and then, the liquid 7 flows from the hollowed space formed into the case 61 into the closed space 3 of the cylinder 2 by passing through the filter 6.

Thereafter, the lid 62 is connected to the opening (upper opening in FIG. 16) of the case 61.

In the case of colloidal damper 50, when the cartridge 60 is connected to the cylinder 2, the first cylindrical portion 61A is entirely inserted into the cylinder 2, and the second cylindrical portion 61B extends out of the cylinder 2.

The colloidal damper 50, with the cartridge 60 connected to the cylinder 2, has the same structure as that of the colloidal damper 1 in accordance with the first exemplary embodiment, illustrated in FIG. 1.

The cartridge 60 may be taken out of the cylinder 2, as for instance, in the following manner.

First, the lid 62 is demounted from the case 61.

Then, the liquid 7 and the porous bodies 8 are discharged through the opening (upper opening in FIG. 16) of the case 61.

Then, the case 61 is removed from the through-hole 2A of the cylinder 2.

Since the cartridge 60 can be replaced, the colloidal damper 50 in accordance with the fifth exemplary embodiment provides an advantage in the case when, for instance, the filter 6 is clogged, or when the performances of the porous bodies 8 are unacceptably deteriorated, meaning that the cartridge 60 may be exchanged to (replaced by) a new one.

Furthermore, when the colloidal damper 50 is not in use, the cartridge 60 may be removed from the cylinder 2, this ensuring a smaller space of storage or housing for the colloidal damper 50.

Besides, by using the cartridge 60 it is possible to extend the volume of the closed space 3 of the cylinder 2 by the additional volume of the hollowed space formed into the case 61.

Figure 17:
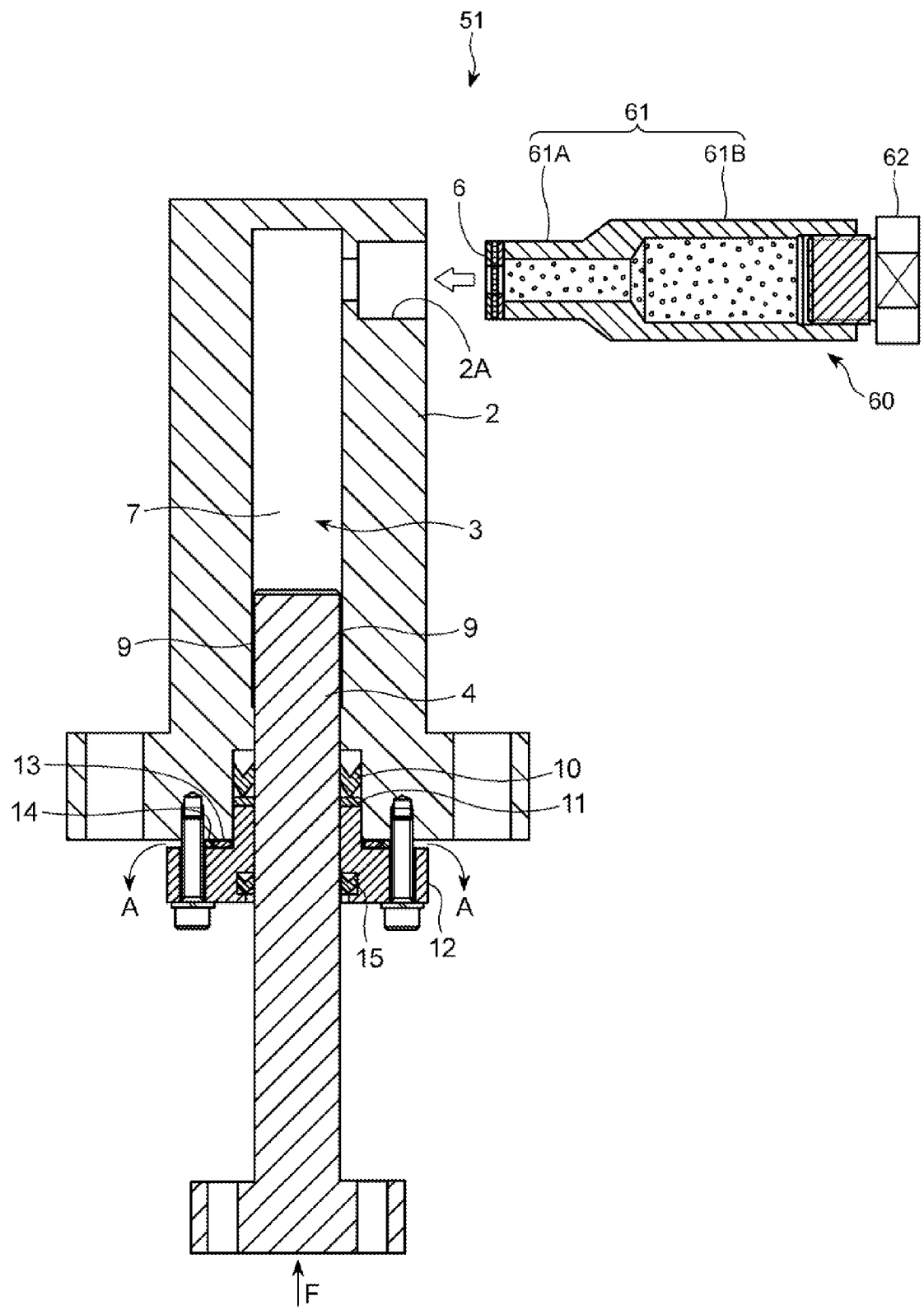
FIG. 17 is a cross-sectional view of the colloidal damper in accordance with a first modification of the fifth exemplary embodiment.

FIG. 17 is a cross-sectional view of the colloidal damper 51 in accordance with a first modification of the fifth exemplary embodiment.

In the case of the colloidal damper 50 in accordance with the fifth exemplary embodiment, illustrated in FIG. 16, the cartridge 60 is connected to the cylinder 2 in such a manner that the cartridge 60 extends in the same direction as the length-wise or axial direction of the cylinder 2.

The cartridge 60 can be also connected to the cylinder 2 in such a manner that the cartridge 60 makes a certain angle with the length-wise or axial direction of the cylinder 2.

In the case of the colloidal damper 51 in accordance with the first modification of the fifth exemplary embodiment, the cartridge 60 is connected to the cylinder 2 in such a manner that the cartridge 60 extends perpendicularly to the length-wise or axial direction of the cylinder 2.

As illustrated in FIG. 17, the through-hole 2A is perpendicularly placed relative to the cylinder 2, and is opened at the external lateral surface of the wall of the cylinder 2. The cartridge 60 can be inserted into the through-hole 2A through the opening at the external lateral surface of the wall of the cylinder 2.

Although in this first modification of the fifth exemplary embodiment the cartridge 60 is connected to the cylinder in such a manner that the cartridge 60 extends perpendicularly to the length-wise or axial direction of the cylinder 2, the angle formed by the axis of the cartridge 60 and the axis of the cylinder 2 is not limited to 90 degrees. Any angle may be selected in the range of 0 to 90 degrees.

By obliquely connecting the cartridge 60 to the cylinder 2, it is possible to increase the number of options relative to the design of the colloidal damper.

Figure 18:
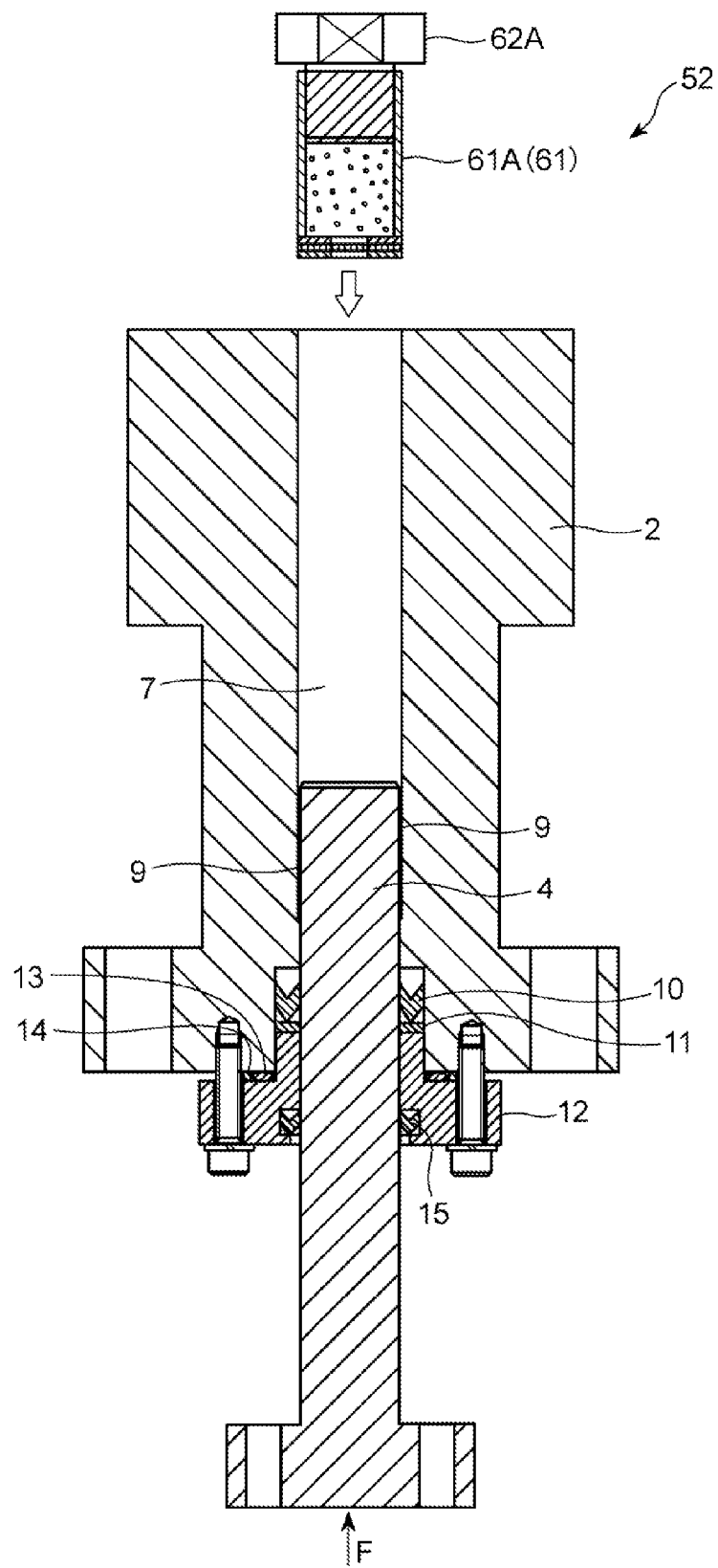
FIG. 18 is a cross-sectional view of the colloidal damper in accordance with a second modification of the fifth exemplary embodiment.

FIG. 18 is a cross-sectional view of the colloidal damper 52 in accordance with a second modification of the fifth exemplary embodiment.

In the second modification of the fifth exemplary embodiment, in comparison with the case 61 illustrated in FIG. 16, a shorter case 61 is designed. Concretely, the case 61 is designed to include only the first cylindrical portion 61A. Accordingly, whereas the second cylindrical portion 61B of the case 61 extends beyond the cylinder 2 in the case of the colloidal damper 50 illustrated in FIG. 16, in the case of the colloidal damper 52 in accordance with the second modification of the fifth exemplary embodiment, the case 61 is entirely inserted into the cylinder 2, and only a head 62A of the lid 62 extends beyond the cylinder 2.

Thus, in comparison with the colloidal damper 50 illustrated in FIG. 16, the colloidal damper 52 can be compactly designed to achieve a smaller size.

The colloidal damper 52 including the cartridge 60 connected to the cylinder 2 has the same structure as the colloidal damper 20 in accordance with the second exemplary embodiment, illustrated in FIG. 4.

Similarly to the first modification of the fifth exemplary embodiment, the cartridge 60 of the colloidal damper 52 may be connected to the cylinder 2 in such a manner that the cartridge 60 extends at a certain angle relative to the length-wise or axial direction of the cylinder 2.

Figure 19:
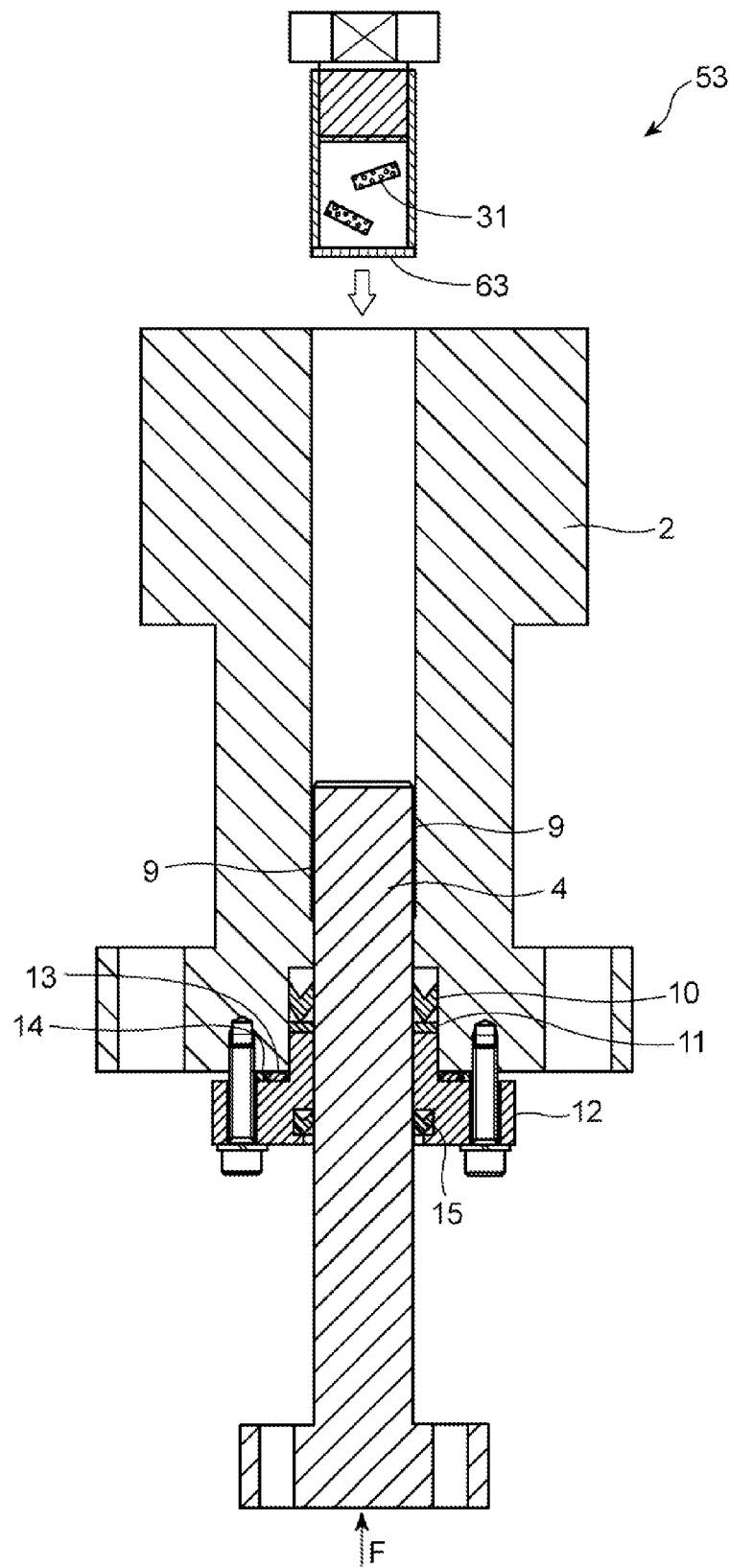
FIG. 19 is a cross-sectional view of the colloidal damper in accordance with a third modification of the fifth exemplary embodiment.

FIG. 19 is a cross-sectional view of the colloidal damper 53 in accordance with a third modification of the fifth exemplary embodiment.

The colloidal damper 53 in accordance with the third modification of the fifth exemplary embodiment, in comparison with the colloidal damper 52 in accordance with the second modification of the fifth exemplary embodiment as illustrated in FIG. 18, is designed to replace the porous bodies 8 with the porous body units 31 (see FIG. 6).

Furthermore, the colloidal damper 53 is designed to replace the filter 6 with the filter 63. The filter 63 is designed with a plurality of pores having such a size that the porous body units 31 are prevented from passing through.

The colloidal damper 53 in accordance with the third modification of the fifth exemplary embodiment provides the same advantages as those provided by the colloidal damper 50 in accordance with the fifth exemplary embodiment.

Similarly to the first modification of the fifth exemplary embodiment, the cartridge 60 in the colloidal damper 53 may be connected to the cylinder 2 in such a manner that the cartridge 60 extends at a certain angle relative to the length-wise or axial direction of the cylinder 2.

Examples

Figure 7:
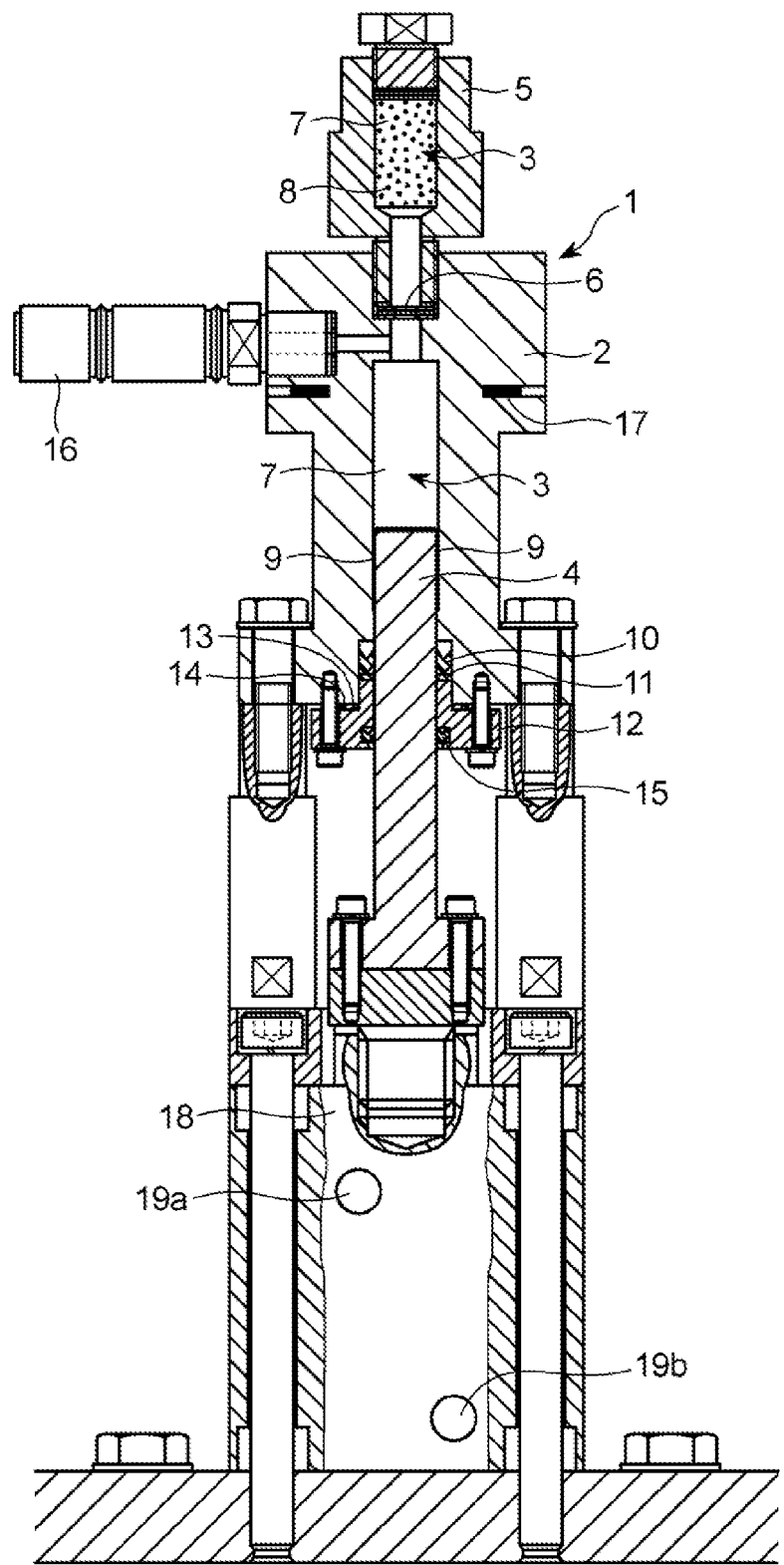
FIG. 7 is a cross-sectional view of the test rig associated to the colloidal damper in accordance with the first exemplary embodiment of the present invention.

The durability tests were carried out for the colloidal damper 1 in accordance with the first exemplary embodiment of the present invention. FIG. 7 is a cross-sectional view of the test rig associated to the colloidal damper 1 in accordance with the first exemplary embodiment of the present invention, and FIG. 8 is a block diagram of the loading system and the measurement equipment of the test rig illustrated in FIG. 7.

As shown in FIG. 7, the test rig is designed to supplementary include a high-pressure gauge 16 used to measure the pressure in the closed space 3, and a thermocouple 17 used to measure the temperature, both of them being added to the cylinder 2 of the colloidal damper 1. The test rig further includes an upper socket 19a and a lower socket 19b used to connect a pump to the low-pressure cylinder 18 that is employed to achieve the loading force F on the piston 4 of the colloidal damper 1. The pump used to operate the low-pressure cylinder 18 can be either a manual pump 19c in the case of static tests (see FIG. 8) or an electrical pump 19d in the case of dynamic tests (see FIG. 8), the selection of the suitable pump being achieved through a switching valve (not illustrated).

Figure 8:
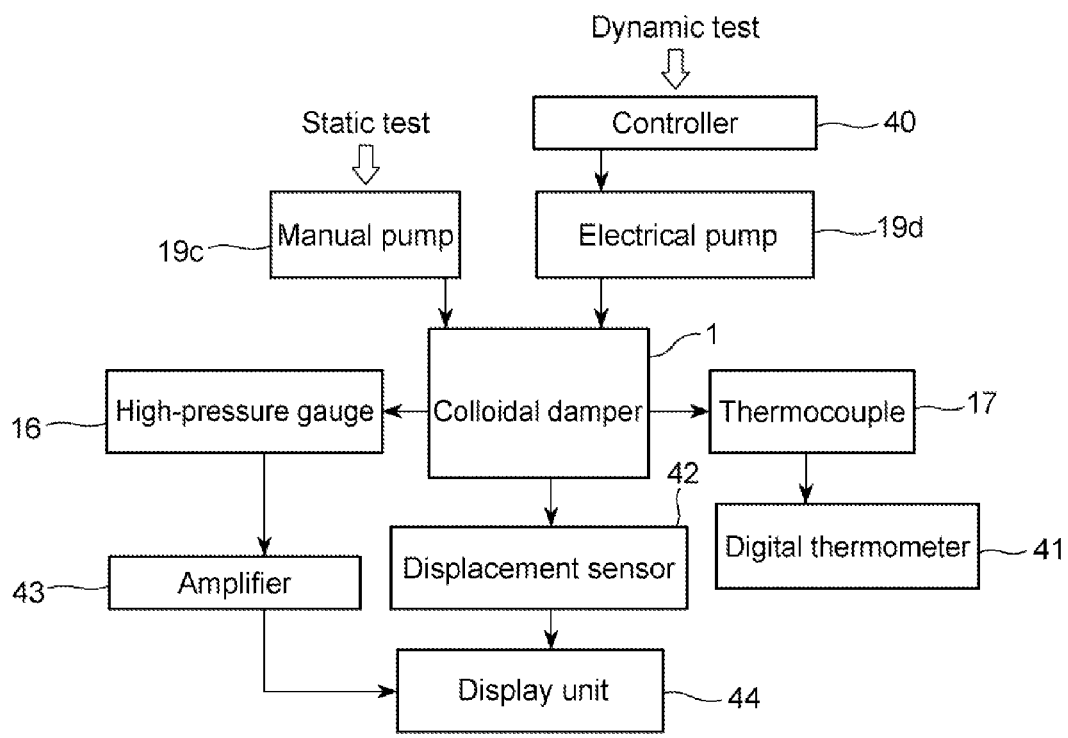
FIG. 8 is a block diagram of the loading system and the measurement equipment of the test rig illustrated in FIG. 7.

As shown in FIG. 8, the test rig includes a controller 40 to control the operation of the electrical pump 19d, a digital thermometer 41 connected to the thermocouple 17 to display and record the temperature, a displacement sensor 42 to measure the stroke of the piston 4 of the colloidal damper 1, an amplifier 43 to amplify the output signal of the high-pressure gauge 16, and a display unit 44 to display and record the results of the measurements carried out by the displacement sensor 42 and the high-pressure gauge 16.

The piston 4 of the colloidal damper 1 has a diameter D of 20 mm, and the maximum pressure which can be achieved in the closed space 3 is 120 MPa. The low-pressure cylinder 18 acts as an oil-hydraulic amplifier of the pump pressure provided either by the manual pump 19c or the electrical pump 19d. Since the low-pressure cylinder 18 has a diameter $D_{ha}$ of 80 mm, the amplification of the pump pressure can be calculated as $(D_{ha}/D)^2=16$. In accordance with the described test rig, it is possible to carry out static tests at low speeds (10 mm/s or smaller) of the piston 4 by using the manual pump 19c, and it is possible to carry out also dynamic tests at frequencies up to 10 Hz, namely, at speeds up to 400 mm/s of the piston 4 by employing the electrical pump 19d. Thus, a certain range of frequency is selected in agreement with a specific application, such as a damper used for vehicle suspensions or as a damper used for anti-seismic systems in earthquake-proof structures.

In Examples, in order to prevent the occurrence of a dead stroke of the piston 4, the dynamic tests are carried out under a given maximum pressure after the closed space 3 was initially pressurized. Furthermore, in order to reproduce the environmental temperature fluctuation from summer to winter conditions, the test rig is introduced inside of an incubator to allow the temperature variation in the range of −10 to 50 degrees centigrade. The test rig provides the variation of the pressure "p" measured by the high-pressure gauge 16, the variation of the stroke "S" of the piston 4 measured by the displacement sensor 42, and the variation of the temperature "T" measured by the thermocouple 17 and displayed by the digital thermometer 41, as time dependent functions. Eliminating the parameter time from the time dependent functions of the pressure "p" and the stroke "S", it is obtained the hysteresis loop of the colloidal damper 1, that is a function defined as p=p(S).

Since the porous bodies 8 used in Examples had the average outer diameter "d2" of 20 micrometers, the test was carried out for three types of filters having pores of 10 micrometers (Example 1), 5 micrometers (Example 2) and 2 micrometers (Example 3), respectively. Thus, all the pores of the filter 6 were smaller than the average outer diameter "d2" of the porous bodies 8. In order to achieve a Reference example, tests were also carried out in the case when the liquid 7 and the porous bodies 8 were directly introduced inside the closed space 3 from the cylinder 2, namely, without the filter 6.

Figure 9:
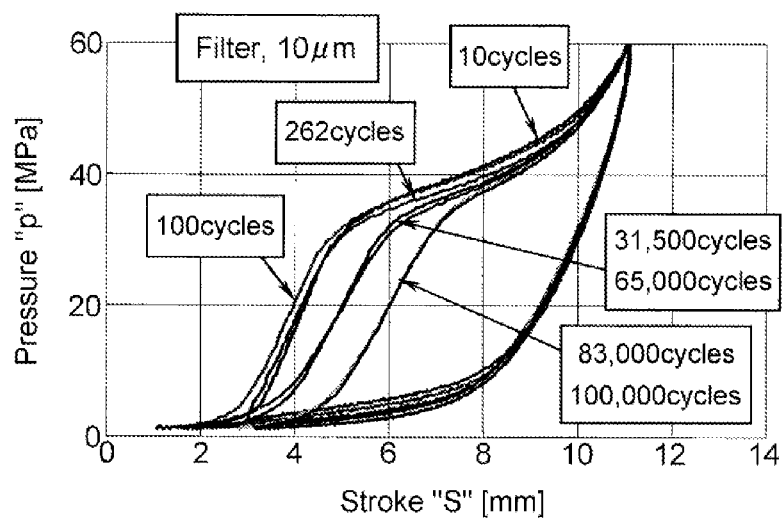
FIG. 9 is a graph showing the hysteresis fluctuation found when the number of working cycles in the Example 1 is increased from 10 up to 100,000.
Figure 10:
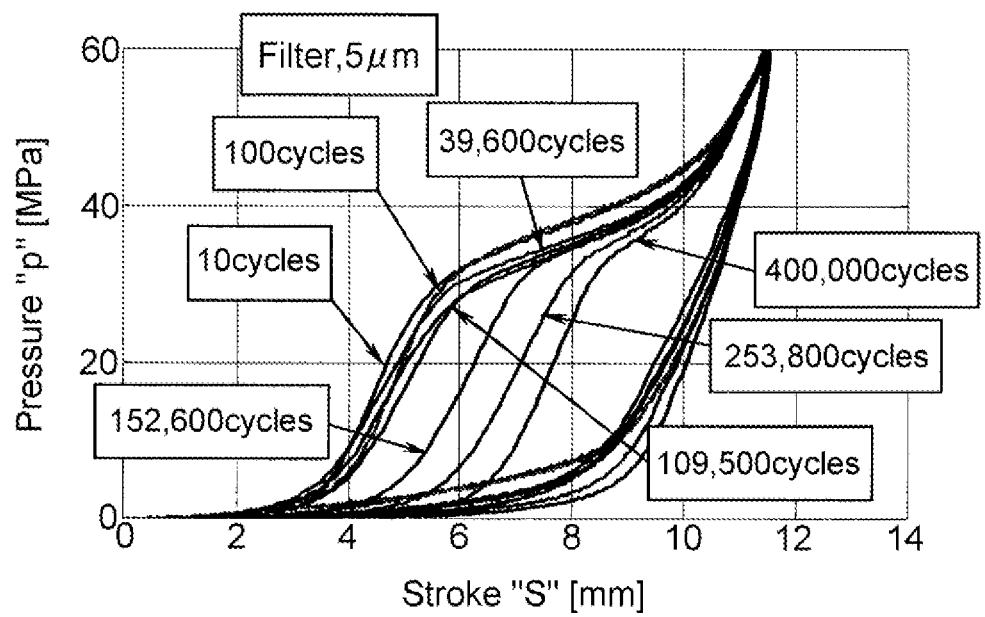
FIG. 10 is a graph showing the hysteresis fluctuation found when the number of working cycles in the Example 2 is increased from 10 up to 400,000.
Figure 11:
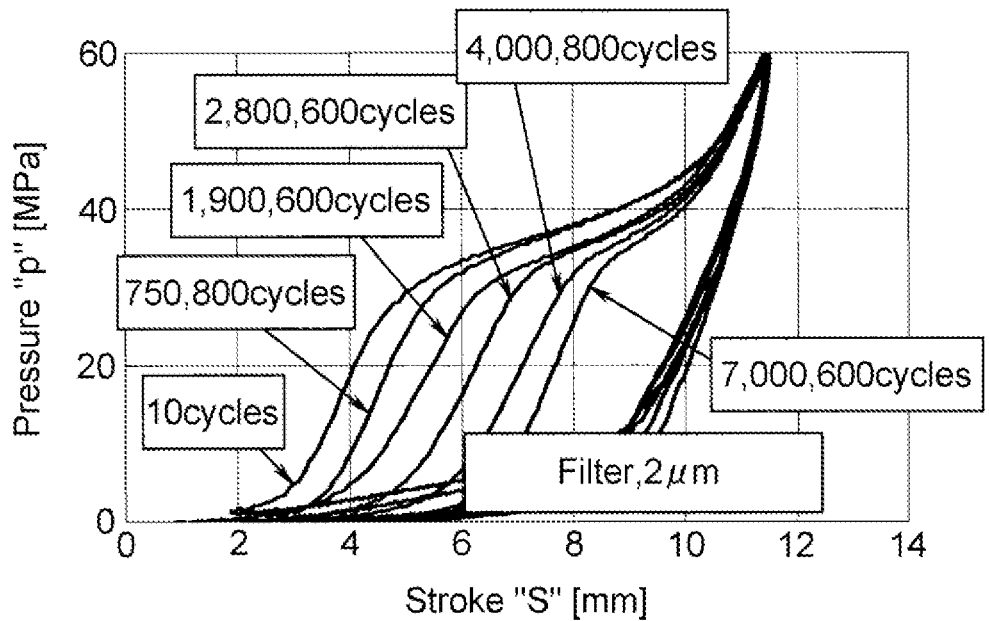
FIG. 11 is a graph showing the hysteresis fluctuation found when the number of working cycles in the Example 3 is increased from 10 up to 7,000,600.
Figure 12:
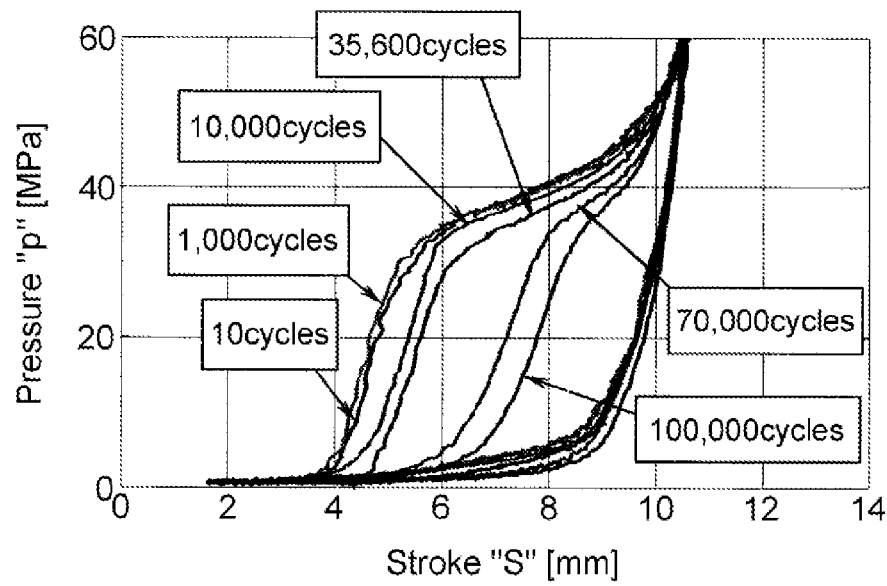
FIG. 12 is a graph showing the hysteresis fluctuation found when the number of working cycles in the Reference example is increased from 10 up to 100,000.

FIG. 9 is a graph showing the hysteresis fluctuation found when the number of working cycles in the Example 1 was increased from 10 up to 100,000. FIG. 10 is a graph showing the hysteresis fluctuation found when the number of working cycles in the Example 2 was increased from 10 up to 400,000. FIG. 11 is a graph showing the hysteresis fluctuation found when the number of working cycles in the Example 3 was increased from 10 up to 7,000,600. FIG. 12 is a graph showing the hysteresis fluctuation found when the number of working cycles in the Reference example is increased from 10 up to 100,000.

With respect to the lifetime of the colloidal damper 1, in order to estimate the advantages obtained through filtration by using the filter 6, Table 1 shows the ratio between the dissipated energy ($E_{100,000}$) found when the number of working cycles was 100,000 and the dissipated energy ($E_{10}$) found when the number of working cycles was 10. With respect to Example 2, Table 1 also shows the ratio between the dissipated energy ($E_{400,000}$) found when the number of working cycles was 400,000 and the dissipated energy ($E_{10}$) found when the number of working cycles was 10. With respect to Example 3, Table 1 further shows the ratio between the dissipated energy ($E_{7,000,600}$) found when the number of working cycles was 7,000,600 and the dissipated energy ($E_{10}$) found when the number of working cycles was 10.

TABLE 1

| Example 1 | Example 2 | Example 2 | Example 3 | Reference |
| --- | --- | --- | --- | --- |
| Filter's pores: 10 micrometers | Filter's pores: 5 micrometers | Filter's pores: 5 micrometers | Filter's pores: 2 micrometers | Without filter |
| $E_{100,000}/E_{10} = 0.64$ | $E_{100,000}/E_{10} = 0.90$ | $E_{400,000}/E_{10} = 0.45$ | $E_{7,000,600}/E_{10} = 0.41$ | $E_{100,000}/E_{10} = 0.45$ |

A comparison between the Example 1 shown in FIG. 9 and the Reference example shown in FIG. 12 reveals that the usage of a filter 6 with pores having a diameter of 10 micrometers in combination with porous bodies 8 having an average outer diameter of 20 micrometers is effective to augment the lifetime of the colloidal damper 1. On the other hand, since the porous bodies 8 in the Reference example have an outer diameter smaller than the size of the gap (50 to 100 micrometers) between the cylinder 21 and the piston 4, the porous bodies 8 penetrate the gap and leak at the packing 10, this leading to a reduction in the durability of the colloidal damper.

A comparison between the Example 1 shown in FIG. 9 and the Example 2 shown in FIG. 10 reveals that the filter 6 having pores with a diameter of 5 micrometers provides a stable hysteresis if the number of working cycles is equal to or smaller than 100,000. This means that the hysteresis of the colloidal damper 1 remains almost undiminished if the number of working cycles is equal to or smaller than 100,000, and thus, it can be concluded that the filter 6, having pores with a diameter of 5 micrometers, namely pores with a diameter which is equal to ¼ of the 20 micrometers that was the average outer diameter of the porous bodies 8, is quite effective.

There is no significant difference between the results corresponding to Example 1 and Reference example, respectively. One of the possible reasons is that the pores of the filter 6 were deformed under the applied high-pressure and became larger. Thus, even if the porous bodies 8 had diameters larger than 10 micrometers, some of the porous bodies 8 were able to pass through the filter 6. Another possible reason is that, although the porous bodies 8 had an average outer diameter of 20 micrometers, measurement of the distribution of the outer diameters revealed that about 5% of the porous bodies 8 had diameters smaller than 10 micrometers, and consequently, such small porous bodies 8 were able to pass through the pores of the filter 6.

As it can be observed from FIG. 9 to FIG. 11, although a filter 6 is used, the hysteresis of the colloidal damper 1 reduces as the number of working cycles is increased. The main reason which can be suggested is that fatigue fracture occurred in the porous bodies 8, and accordingly, the outer diameters of the porous bodies 8 gradually decreased. Consequently, the porous bodies 8 became able to pass through the filter 6 and in the end to leak out from the closed space 3. Thus, the effective mass of the porous bodies 8 decreases and the dissipated energy reduces proportionally. However, it can be observed from Table 1 that the life in Example 2 is four times longer than the life corresponding to the Reference example, and the life in Example 3 is seventy times longer than the life obtained in the Reference example. Such conclusion can be drawn by observing for instance the ratio between the dissipated energy ($E_{400,000}$) found when the number of working cycles is 400,000 and the dissipated energy ($E_{10}$) found when the number of working cycles is 10 in Example 2, and the ratio between the dissipated energy ($E_{100,000}$) found when the number of working cycles is 100,000 and the dissipated energy ($E_{10}$) found when the number of working cycles is 10 in the Reference example, respectively.

Figure 13:
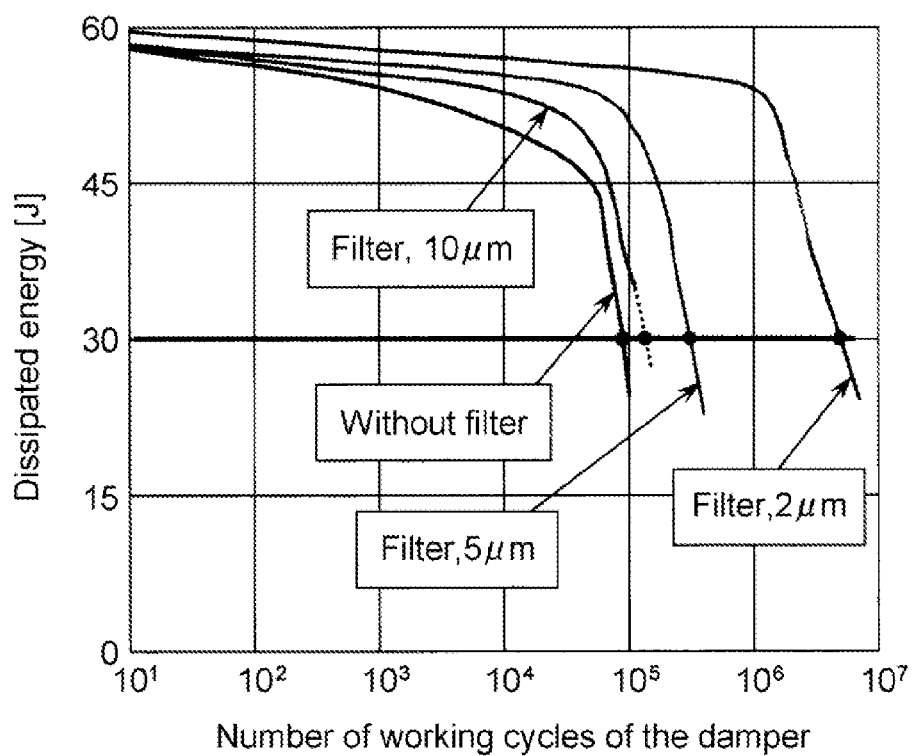
FIG. 13 is a graph showing the relationship between the dissipated energy and the number of working cycles of the colloidal damper.

Next, the relation between the dissipated energy of the colloidal damper 1 and the number of working cycles is discussed. For instance, as shown in FIG. 13, if the number of working cycles increases in Example 3, the dissipated energy of the colloidal damper 1 decreases slowly up to a number of working cycles of 1,000,000, but the dissipated energy reduces abruptly if the number of working cycles exceeds 1,000,000. Accordingly, the following countermeasures are proposed.

(1) Considering the porous bodies 8 as expendable, if the number of working cycles exceeds 1,000,000, the damaged porous bodies 8 can be replaced by new porous bodies 8, for instance, when an automobile is inspected for official authorization.

(2) The filter 6 can be selected to have pores with a smaller diameter. For instance, if the filter 6 is selected to have pores with a diameter of 1 micrometer, it is conceivable that the life of the colloidal damper can be further lengthened. However, if by selecting a filter 6 with pores of smaller diameter the cost of the filter 6 becomes higher than the cost of the porous bodies 8, the above-mentioned option (1) would be a better solution.

(3) Porous bodies 8 with increased strength can be designed in order to avoid the premature fatigue fracture of the porous bodies 8.

Figure 14:
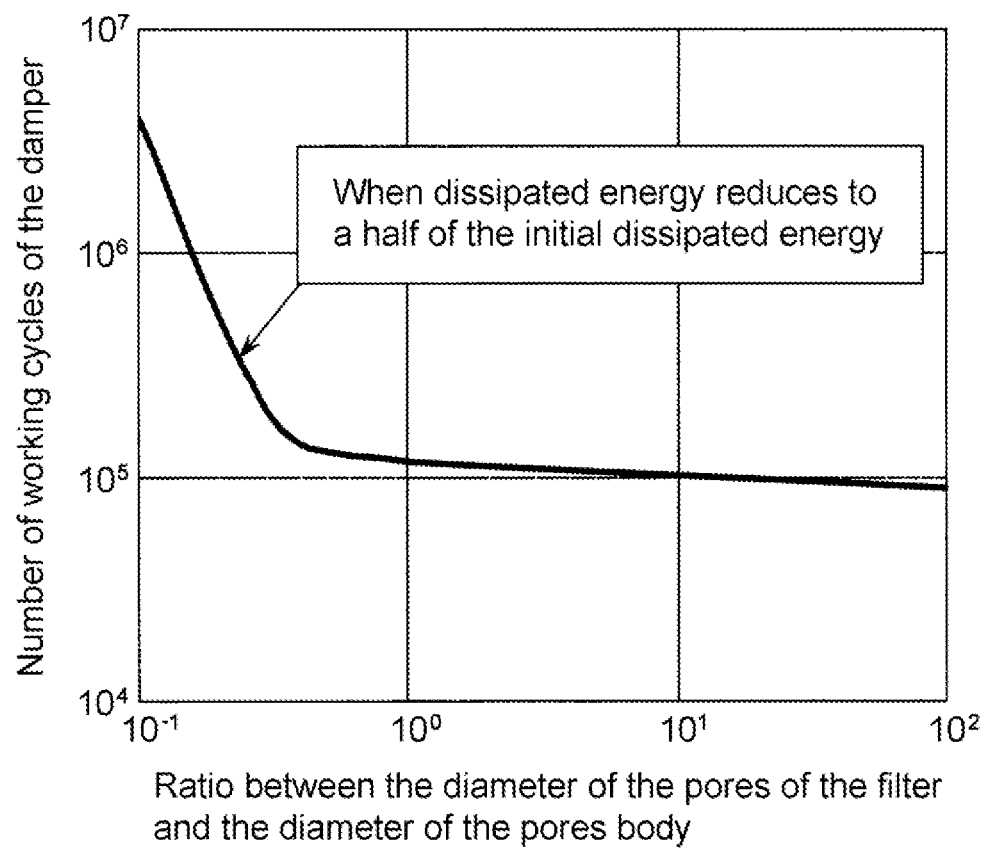
FIG. 14 is a graph showing the fluctuation in the number of working cycles of the colloidal damper with respect to the ratio between the diameter of the pores of the filter and the diameter of the porous body, found when the dissipated energy reduces to a half of the initial dissipated energy.

FIG. 14 is a graph showing the fluctuation in the number of working cycles of the colloidal damper 1 with respect to the ratio between the diameter of the pores of the filter 6 and the diameter of the porous body, found when the dissipated energy reduces to a half of the initial dissipated energy. Based on the results shown by FIG. 14, in the design stage of the colloidal damper, for a given diameter of the porous bodies 8 and a desired life, it becomes possible to select the optimal filter 6 (the optimal diameter of the pores of the filter 6).

INDUSTRIAL APPLICABILITY

The colloidal damper in accordance with the present invention is useful as a suspension damper to equip a vehicle such as a bicycle, an automobile, a motorbike, a truck, a bulldozer, an airplane, etc., or as a damper for anti-seismic systems such as seismic isolation systems, earthquake-control systems, etc.

The invention claimed is:

1. A colloidal damper comprising:
   a cylinder having a through-hole;
   a piston guided and supported by the cylinder during its reciprocating movement inside the through-hole, and defining a closed space in association with the cylinder;
   a cartridge detachably inserted into the through-hole of the cylinder, the cartridge being hollow;
   a liquid contained in the closed space and in an inner space inside the cartridge; and
   a porous body housed in the inner space inside the cartridge,
   the cartridge comprising:
   a case including a portion detachably inserted into the through-hole of the cylinder, wherein the portion and the through-hole are configured such that the cartridge can be removably attached to the cylinder, and the case is hollow at both ends;
   a lid connected to one of the opened ends of the case; and
   a filter connected to the other opened end of the case, and inserted into the through-hole of the cylinder together with the case,
   the porous body absorbing inside it the liquid when the liquid is pressurized by the piston, and discharging outside it the liquid when the liquid is depressurized, the filter having a plurality of first pores, and each first pore having a diameter smaller than an outer diameter of the porous body.

2. The colloidal damper as set forth in claim 1, wherein the cartridge is inserted into the through-hole of the cylinder in such a manner that the cartridge extends in the same direction as the axial direction of the cylinder.

3. The colloidal damper as set forth in claim 1, wherein the cartridge is inserted into the through-hole of the cylinder in such a manner that the cartridge extends at a certain angle relative to the axial direction of the cylinder.

4. The colloidal damper as set forth in claim 3, wherein the angle is 90 degrees.

5. The colloidal damper as set forth in claim 1, wherein the case is entirely inserted into the cylinder.

6. The colloidal damper as set forth in claim 1, wherein the lid is detachably connected to the case.

7. The colloidal damper as set forth in claim 1, wherein the filter is detachably connected to the case.

8. The colloidal damper as set forth in claim 1, wherein the cartridge includes a porous body unit,
   wherein the porous body unit includes a hollow and closed case made of a porous material,
   wherein the porous body is disposed in the hollow and closed case of the porous body unit, wherein the hollow and closed case of the porous body unit has a plurality of second pores, and each second pore has a diameter smaller than an outer diameter of the porous body, wherein the hollow and closed case of the porous body unit cannot pass through the first pores of the filter.

9. The colloidal damper as set forth in claim 8, wherein the hollow and closed case of the porous body unit includes a tube open at both ends and caps covering both ends of the tube.

10. The colloidal damper as set forth in claim 1, wherein the porous body includes a cavity formed therein, and
    wherein the porous body includes second pores which extend substantially radially from the cavity, and are opened at an outer surface of the porous body.

11. The colloidal damper of claim 1, wherein a face of the cylinder has an opening, and the cartridge is disposed in the opening.

12. The colloidal damper of claim 1, wherein a face of the cylinder has an opening, and the cartridge is disposed in the opening and protrudes from the cylinder.

13. The colloidal damper of claim 1, wherein a face of the cylinder has an opening, and the cartridge is configured to be inserted into the opening and detachable from the opening.

14. The colloidal damper of claim 1, wherein the filter is adhered between two copper gaskets using an adhesive.

* * * * *